United States Patent
Duong et al.

(10) Patent No.: US 9,877,066 B2
(45) Date of Patent: Jan. 23, 2018

(54) SYNCHRONIZATION OF MULTIMEDIA STREAMS

(71) Applicant: THOMSON LICENSING DTV, Issy de Moulineaux (FR)

(72) Inventors: Quang Khanh Ngoc Duong, Rennes (FR); Yvon Legallais, Rennes (FR); Christopher Howson, Corps-Nud (FR)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 0 days.

(21) Appl. No.: 14/389,785

(22) PCT Filed: Apr. 2, 2013

(86) PCT No.: PCT/EP2013/056871
§ 371 (c)(1),
(2) Date: Oct. 1, 2014

(87) PCT Pub. No.: WO2013/149989
PCT Pub. Date: Oct. 1, 2013

(65) Prior Publication Data
US 2015/0095931 A1   Apr. 2, 2015

(30) Foreign Application Priority Data

Apr. 5, 2012 (EP) .................................. 12305405

(51) Int. Cl.
*H04N 21/43* (2011.01)
*H04N 5/04* (2006.01)
(Continued)

(52) U.S. Cl.
CPC ........... *H04N 21/4307* (2013.01); *H04N 5/04* (2013.01); *H04N 5/607* (2013.01); *H04N 21/242* (2013.01);
(Continued)

(58) Field of Classification Search
CPC ............. H04N 21/439; H04N 21/8547; H04N 21/4307; H04N 21/4302; H04N 21/4126; H04N 21/8173
See application file for complete search history.

(56) References Cited

U.S. PATENT DOCUMENTS 1,002,220 A1    1/2011  Scharrer et al.
2004/0148159 A1*  7/2004  Crockett ............ G06K 9/00536
                                         704/211
(Continued)

FOREIGN PATENT DOCUMENTS

CN    1620684   5/2005
CN    1742492   3/2006
(Continued)

OTHER PUBLICATIONS

Wang: "An industrial-strength audio search algorithm"; Proceedings of 4th International Conference on Music Information Retrieval, Baltimore, Maryland, USA, Oct. 27, 2003 (Oct. 27, 2003), pp. 1-7.
(Continued)

*Primary Examiner* — Benjamin R Bruckart
*Assistant Examiner* — Susan X Li
(74) *Attorney, Agent, or Firm* — Tutunjian & Bitetto, P.C.

(57) ABSTRACT

This method for synchronizing a first multimedia stream rendered on a first terminal and a second multimedia stream rendered on a second terminal, comprises a step of generation, from an original audio sequence of the first stream, of original audio fingerprints, and further comprises steps of:
  a) generation from a first sequence of the first stream first audio fingerprints;
  b) comparison between the first fingerprints and the original fingerprints in order to obtain one or more first synchronization positions;
(Continued)

c) correlation of the first sequence with one or more pieces of the original sequence located around the first synchronization positions in order to obtain a second synchronization position;

d) rendering of the second stream on the second terminal using the second synchronization position.

20 Claims, 4 Drawing Sheets

(51) Int. Cl.
  *H04N 5/45*   (2011.01)
  *H04N 5/60*   (2006.01)
  *H04N 21/462*  (2011.01)
  *H04N 21/439*  (2011.01)
  *H04N 21/41*   (2011.01)
  *H04N 21/242*  (2011.01)
  *H04N 21/44*   (2011.01)

(52) U.S. Cl.
  CPC ..... *H04N 21/4122* (2013.01); *H04N 21/4394* (2013.01); *H04N 21/44008* (2013.01); *H04N 21/4622* (2013.01); *H04N 5/45* (2013.01)

(56) References Cited

U.S. PATENT DOCUMENTS

| | | | |
|---|---|---|---|
| 2006/0156374 A1* | 7/2006 | Hu | H04N 7/163 725/135 |
| 2006/0277047 A1* | 12/2006 | DeBusk et al. | 704/273 |
| 2009/0205008 A1* | 8/2009 | Wollmershauser et al. | 725/131 |
| 2011/0013075 A1* | 1/2011 | Kim et al. | 348/370 |
| 2011/0112669 A1 | 5/2011 | Scharrer et al. | |
| 2011/0275312 A1 | 11/2011 | Buehler et al. | |
| 2011/0289532 A1* | 11/2011 | Yu | H04N 21/4126 725/38 |
| 2012/0245722 A1* | 9/2012 | Yamamura | 700/94 |

FOREIGN PATENT DOCUMENTS

| | | |
|---|---|---|
| CN | 101189658 | 5/2008 |
| WO | 020977991 | 12/2002 |
| WO | 2004075565 | 9/2004 |
| WO | WO2004075565 | 9/2004 |
| WO | 2006086556 | 8/2006 |

OTHER PUBLICATIONS

Brandstein et al: A robust method for speech signal time-delay estimation in reverberant rooms Apr. 21-24, 1997, IEEE Comput, Soc; US, vol. 1, Apr. 21, 1997 (Apr. 21, 1997), pp. 375-378.

Howson etal: "Second Screen TV Synchronizatlon"; 2011 IEEE International Conference onConsumerElectronics, Sep. 8, 2011 (Sep. 8, 2011),pp. 361-365.

Canoa et al: "A review of audio fingerprinting" ;Journal of VLSI Signal Processing, No. 3, pp. 271-284,2005.

Fink et al: "Social- and interactive-television applications based on real-time ambient-audio identification", in Proc. European Interactive TV Conference (Euro-ITV),2006, pp. 1-9.

Haitsama etal: "A highly robust audio fingerprinting system",Oct. 17, 2002, Internet Citation; pp. 1-9.

Kim et el: "Audio watermarking techniques", in Intelligent Watermarking Techniques, Chapter 8, pp. 185-218, 2004.

Nielsen et al: "Synchronizaton and comparison of lifelog audio recordings" ,in Proc. IEEE Workshop on Machine Learning for Signal Processing (MLSP); Oct. 16-19, 2008, pp. 474-479.

Wan et al: "Robust time delay estimation algorithm based on adaptive frequency selection", Journal of Southeast University (Natural Science Edition) ,vol. 40, No. 5, 890-894; Sep. 2010.

Wang et al: "Array Acoustic Time Delay Estimation Based on Generalized Cross Correlation"; Audio Engineering, vol. 34, No. 8, 37-39; 2010.

Search Report dated June 21, 2013.

* cited by examiner

SYNCHRONIZATION OF MULTIMEDIA STREAMS

This application claims the benefit, under 35 U.S.C. §365 of International Application PCT/EP2013/056871, filed Apr. 2, 2013, which was published in accordance with PCT Article 21(2) on Oct. 10, 2013 in English and which claims the benefit of European patent application No. 12305405.8, filed Apr. 5, 2012.

FIELD OF THE INVENTION

The present invention generally relates to the processing of multimedia streams originating from different multimedia sources and/or transmitted using different transport protocols and restored on at least one rendering device.

More particularly, the invention deals with the synchronization of such multimedia streams. It finds application, in particular, in second screen TV situations in which related contents are simultaneously rendered on a personal terminal and on a TV set, for example.

Thus, the invention concerns a method, a device and a system for synchronizing multimedia data streams. It also concerns a computer program implementing the method of the invention.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The complementary nature of broadcast and broadband IP networks has opened the door to a hybrid delivery model in which the strengths of each network are leveraged to provide personalized TV services. Such a delivery model is already being exploited by a number of actors in the TV landscape. The manufacturers of consumer equipments are providing "Connected TVs" incorporating broadband access to catch-up TV, enhanced program guides and Internet video.

Initiatives such as HbbTV (Hybrid Broadcast Broadband TV) and YouView have brought together broadcasters, content providers and Internet service providers seeking to define a standardized approach to the provision of hybrid broadcast broadband services. Whilst the first HbbTV services were launched as long ago as December 2009, current hybrid TV service deployments do not yet exploit the full potential of the Internet for the delivery of media content and there remains significant potential for further innovation.

By using broadcast delivery for mass distribution of popular programs and broadband delivery for long tail and on demand content, a combined delivery model is well adapted for providing personalized value-added TV services to large numbers of subscribers.

Companion terminals, such as tablets or smartphones, are becoming well established as "TV buddies" for the consumption of personalized content linked to TV broadcasts. In the article of C. Howson et al. "Second Screen TV Synchronization", 2011 IEEE International Conference on Consumer Electronics, second screen use cases are envisaged, in which an alternative audio or video content, linked to broadcast programs, is carried over broadband, thereby enabling personalization and alleviating the burden on broadcast network bandwidth.

One example of such a service offers the user the possibility of selecting his preferred audio soundtrack on a handheld device, to accompany the broadcast video, displayed on a TV set. The main audio and video components are delivered over a broadcast network, whilst several other languages are available on-demand over the Internet.

Another such service would enable a user to select a broadband delivered alternative view of a sporting or music event and render this on his tablet, in conjunction with the broadcast content displayed on a TV set.

If the user experience of such second screen services is to be acceptable, then the media components, delivered separately over broadband and broadcast networks, need to be rendered with accurate synchronization.

Whilst existing hybrid TV services do employ trigger mechanisms for interactive applications, they do not incorporate techniques that would allow, for example, an alternative soundtrack delivered over the Internet to be automatically and accurately synchronized with a broadcast video component.

The above cited paper proposes a system, for the deployment of second screen personalized TV services, which enables the rendering of content components, delivered independently over broadband and broadcast networks, to be synchronized in user devices. The solution disclosed in this paper is based on the addition of an auxiliary component timeline associated with each group of media components delivered over the broadcast network and, in some cases, also over the broadband network. This timeline component conveys synchronization information related to each event and is used to align the presentation of the media components.

However, the solution disclosed in the above paper is not a direct solution since it requires a signature, i.e. the timeline component, to be embedded into the original media content.

SUMMARY OF THE INVENTION

The present invention proposes a solution for improving the situation.

Accordingly, the present invention provides a synchronization method for synchronizing a first multimedia stream intended for being rendered on a first terminal and a second multimedia stream intended for being rendered on a second terminal, comprising a preliminary step of generation, from an original audio sequence of the first multimedia stream, of original audio fingerprints, and further comprising steps of:
  a) receiving a first sequence of audio data of the first multimedia stream;
  b) generation from the first sequence of first audio fingerprints;
  c) comparison between the first audio fingerprints and blocks of the original audio fingerprints in order to obtain one or more first synchronization positions in the original sequence;
  d) correlation of the first sequence with one or more pieces of the original sequence located around the first synchronization positions in order to obtain only one second synchronization position in the original sequence; and
  e) synchronization of the first and the second multimedia streams using the second synchronization position.

By combining the use of fingerprinting and cross-correlation techniques, the method of the present invention provides an accurate synchronization of the multimedia streams in a very short time without modifying the multimedia streams. More precisely, it allows the accurate identification of the rendering position, i.e. the time elapsed from the beginning of the rendering, in the first multimedia stream so that the second terminal can request, at the right moment, a second stream, synchronized with the first stream, from a content server.

Even in case a good match is found by comparing fingerprints, the fingerprinting provides a first synchronization position having an accuracy in the order of a frame, i.e. a coarse synchronization position, since a fingerprint is computed for each audio frame of the considered sequence, while the correlation permits to improve the accuracy to the order of a sample, i.e. the second synchronization position is more accurate than the first synchronization position.

Advantageously, the correlation uses a generalized cross-correlation with phase transform technique.

This technique, also named GCC-PHAT, is described for example in the paper of M. S. Brandstein and H. F. Silverman, "A robust method for speech signal time-delay estimation in reverberant rooms," in Proc. IEEE Int. Conf. on Acoustics, Speech, and Signal Processing (ICASSP), 1997, pp. 375-378.

The use of this technique, where the generalized cross-correlation is performed in the frequency domain, improves the synchronization capacity over the noise while being computationally inexpensive.

Advantageously, the method comprises a step of capture by the second terminal, during a first duration, of the first sequence of audio data of the first multimedia stream while said first sequence is rendered on said first terminal.

Advantageously, the first duration is shorter than 5 seconds, preferably comprised between 0.5 and 3 seconds.

By using such a short recording, the synchronization is first performed in a very short time. Thus, in most cases a user does not have to wait a lot of time to obtain the rendering service on the second terminal.

Preferably, the first and the original audio fingerprints are compared by computing a distance between pairs of fingerprints of the first sequence and of the original sequence.

For instance, the computed distance is an Euclidean or a Hamming distance.

Advantageously, if a second synchronization position is not obtained at step d), the method further comprises a new step of reception of a second sequence of audio data of the first multimedia stream and wherein steps b) to d) are repeated using the second sequence alone or a combination of the first and second sequences instead of the first sequence.

Preferably, the second sequence is captured by the second terminal during a second duration.

According to a first embodiment, the second terminal is the same as the first terminal.

In this case, both the first and the second multimedia streams are rendered on the same terminal, as for example in the context of a "Picture in Picture" service.

According to a second embodiment, the second terminal is different from the first terminal.

In this case, the first and the second multimedia streams are rendered on two separate displaying devices, and the sound is captured by the second terminal from the first one which is then considered as the master device for the rendering time.

Advantageously, the method further comprises a step of rendering of the second multimedia stream on the second terminal using the second synchronization position.

The invention also provides a synchronization system for synchronizing a first multimedia stream intended for being rendered on a first terminal and a second multimedia stream intended for being rendered on a second terminal, comprising said first and second terminals and further comprising:
  a first processor for generating, from an original audio sequence of the first multimedia stream, original audio fingerprints;
  a microphone for capturing by the second terminal, during a first duration, a first sequence of audio data of the first multimedia stream while said first sequence is rendered on said first terminal;
  a second processor for generating, from the first audio sequence, first audio fingerprints;
  a comparator for comparing the first audio fingerprints and blocks of the original audio fingerprints in order to obtain one or more first synchronization positions in the original sequence;
  a correlator for correlating the first sequence with one or more pieces of the original sequence located around the first synchronization positions in order to obtain only one second synchronization position in the original sequence; and
  a synchronizer for synchronizing the first and the second multimedia streams using the second synchronization position.

The invention further provides a synchronization device for synchronizing a first multimedia stream intended for being rendered on a first terminal and a second multimedia stream intended for being rendered on a second terminal, comprising:
  a first processor for generating, from an original audio sequence of the first multimedia stream, original audio fingerprints;
  a second processor for generating, from a first sequence of audio data of the first multimedia stream, first audio fingerprints;
  a comparator for comparing the first audio fingerprints and blocks of the original audio fingerprints in order to obtain one or more first synchronization positions in the original sequence;
  a correlator for correlating the first sequence with one or more pieces of the original sequence located around the first synchronization positions in order to obtain only one second synchronization position in the original sequence; and
  a synchronizer for synchronizing the first and the second multimedia streams using the second synchronization position.

Advantageously, the synchronization device is included in the second terminal.

This second terminal may be, for example, a smart-phone or a tablet,

Alternatively, the synchronization device may be located in a user's home, for example included in a set-top box or in a gateway. It may even be included in the first terminal.

The synchronization device may also be remote from a user's home, for example included in a web server.

Thus, the components of the synchronization device may be integrated in a same housing either remote from the user's home or either located in the user's home.

As an alternative, a part of the components of the synchronization device is located in the user's home while another part is remote from the user's home.

In the cases in which at least a part of the synchronization process is located in the user's home, this part is able to access to the original audio sequence or directly to the original audio fingerprints, for example through an Internet connection.

The method according to the invention may be implemented in software on a programmable apparatus. It may be implemented solely in hardware or in software, or in a combination thereof.

Since the present invention can be implemented in software, the present invention can be embodied as computer readable code for provision to a programmable apparatus on any suitable carrier medium. A carrier medium may comprise a storage medium such as a floppy disk, a CD-ROM, a hard disk drive, a magnetic tape device or a solid state memory device and the like.

Figure 3:
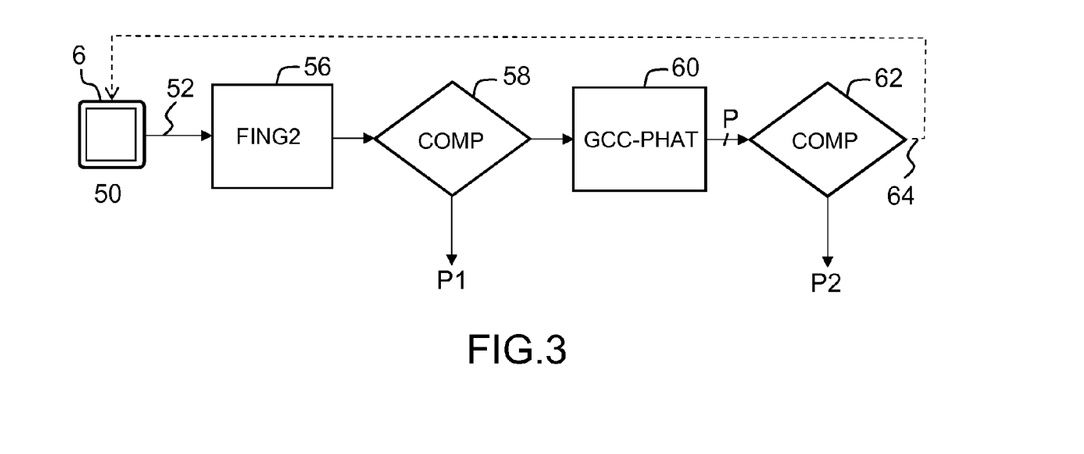
FIG. 3 is a flowchart showing the steps of a synchronization method according to an embodiment of the present invention.

The invention thus provides a computer-readable program comprising computer-executable instructions to enable a computer to perform the method of the invention. The diagram of FIG. 3 illustrates an example of the general algorithm for such computer program.

BRIEF DESCRIPTION OF THE DRAWINGS

The present invention is illustrated by way of examples, and not by way of limitation, in the figures of the accompanying drawings, in which like reference numerals refer to similar elements and in which.

DETAILED DESCRIPTION OF PREFERRED EMBODIMENTS

Figure 1:
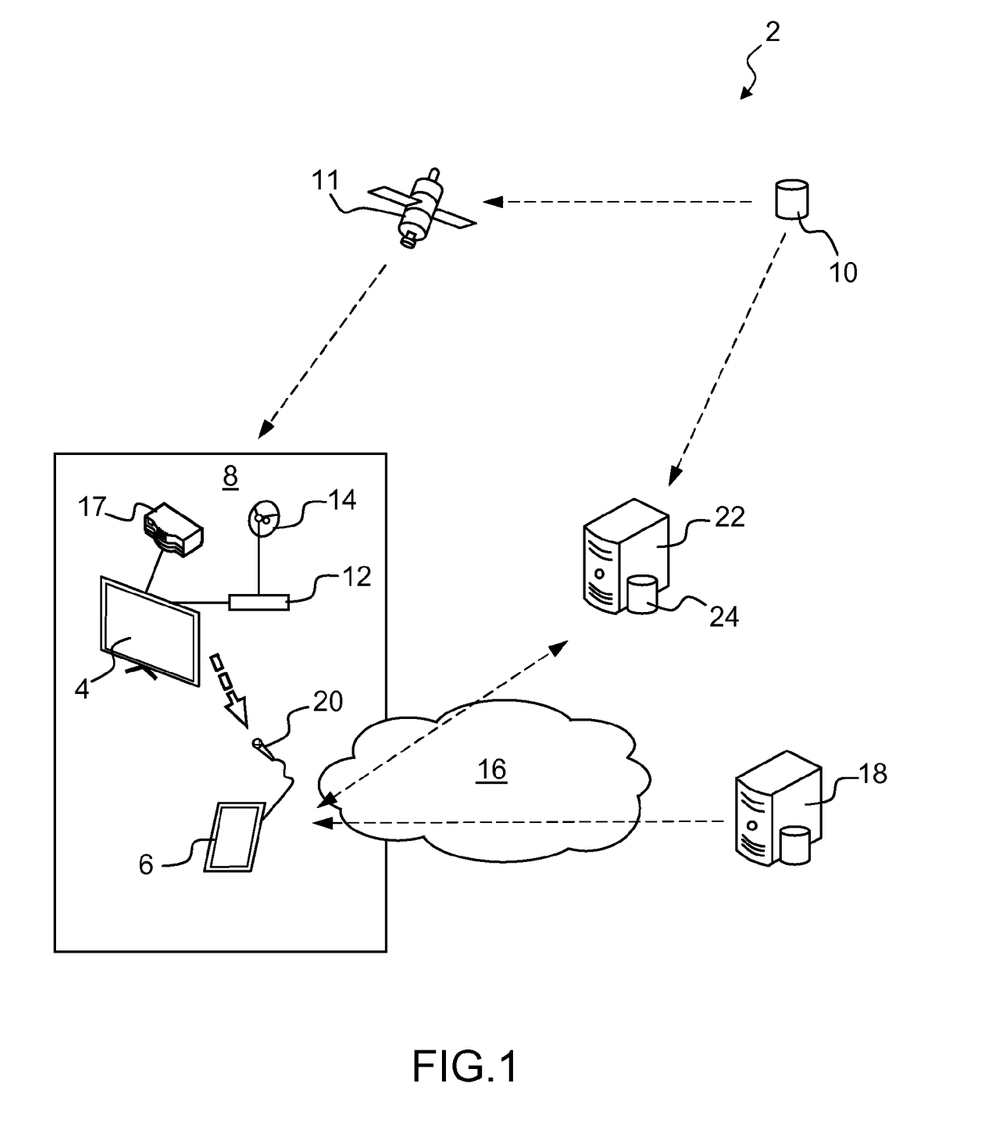
FIG. 1 is a schematic view of an embodiment of a synchronization system according to the invention.

Referring to FIG. 1, there is shown therein a schematic view of a synchronization system 2 according to a preferred embodiment of the invention.

The synchronization system 2 comprises a first terminal 4 and a second terminal 6 located in a user's home 8. The first terminal 4 is, for instance, a TV set constituting a main display for the user, while the second terminal 6 is, for example, a smartphone or a tablet used as a second screen device by the user.

The content displayed on the first terminal 4 is transmitted from an original content server 10 through a broadcast network 11. To receive such broadcast content, for example a DVB-T or a DVB-C multimedia stream, the first terminal 4 is linked to a set-top box 12 which is linked to an antenna 14. The set-top box 12 is also preferably able to receive multimedia streams from the Internet 16 or from a home network in the user's home 8.

The content displayed on the first terminal 4 can be also provided by any local or remote source like streaming from a remote or local audio and/or video server, a video file, a DVD, a Blu-ray Disc, etc. For this, the first terminal 4 is also connected to a local content source 17, for example a DVD and/or a bluray reader.

The second terminal 6 is connected, via the Internet network 16, to a complementary content server 18 containing contents related to the contents of the original content server 10. The access to the complementary service is, for example, provided by the set-top box 12 to the second terminal 6 thanks to information embedded in the broadcast stream received from the broadcast network 11.

In another embodiment, a complementary content of the complementary content server 18 is accessible to the second terminal 6 from a web site easily identified by the user because it is tightly coupled with the broadcast content received on the first terminal 4. This web site may be the web site of the broadcast provider or the web site of the studio which produced the main content provided from the original content server 10.

With these equipments of the user's home 8, it is possible for the user to receive a first multimedia stream, originating from the original content server 10, that will be rendered by the first terminal 4 and a second multimedia stream, originating for instance from the complementary server 18, that will be rendered by the second terminal 6.

The user may wish to receive simultaneously related contents in both terminals 4, 6. For instance, the user may wish to receive an alternative view of a sporting or music event and render this on the second terminal 6, in conjunction with the main content displayed on the first terminal 4.

The synchronization system 2 of the present invention enables a perfect synchronization of both contents in order to render them simultaneously on the terminals 4, 6.

Thus, the synchronization system 2 comprises a microphone 20 connected to the second terminal 6. This microphone 20 is able to record an audio content rendered the first terminal 4.

Besides, the synchronization system 2 comprises a synchronization device 22 connected to the user's home 8 and to both the original content server 10 and the complementary content server 18. In the represented embodiment, the synchronization device 22 is located remotely from the user's home 8.

Alternatively, the synchronization device 22 may be located in the user's home 8, for example implemented in the set-top box 12 or in the second terminal 6.

In another alternative, parts of the synchronization device 22 may be implemented in the user's home while other parts are implemented remotely.

The synchronization system 2 comprises also a memory 24.

Figure 2:
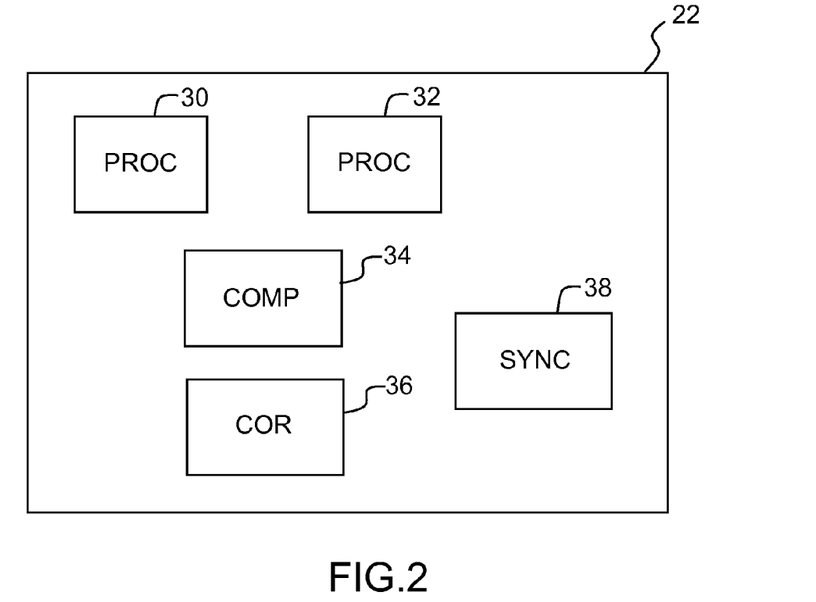
FIG. 2 is a schematic view of an embodiment of a synchronization device according to the invention.

As shown on FIG. 2, the synchronization device 22 comprises a first processor 30 and a second processor 32. Both processors 30, 32 are able to generate audio fingerprints from an audio sequence according to any conventional suitable fingerprinting algorithm. The processors 30, 32 may be two separate processors or one unique processor.

The synchronization device 22 also comprises a comparator 34 able to compare two sets of audio fingerprints by computing a distance, e.g. Euclidean or Hamming distance, between pairs of fingerprints of both sets.

The synchronization device 22 further comprises a correlator 36 able to cross-correlate two audio sequences using a generalized cross correlation with phase transform, also named GCC-PHAT, technique.

It further comprises a synchronizer 38 able to synchronize two multimedia streams using a synchronization position by requesting the complementary content server 18 to send media content starting from a synchronization position to the second terminal 6.

Figure 4:
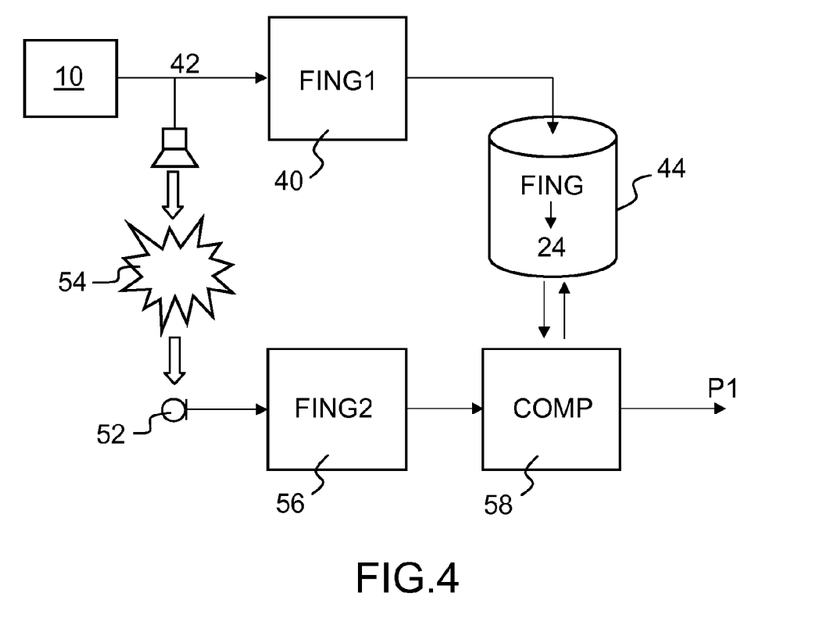
FIG. 4 is a flowchart detailing the fingerprinting steps of the method of FIG. 3.

The flowcharts of FIGS. 3 and 4 detail the steps of the synchronization method of the invention, according to a preferred embodiment.

The method is implemented, while a first multimedia stream transmitted from the original content server 10 is being rendered on the first terminal 4.

Figure 6:
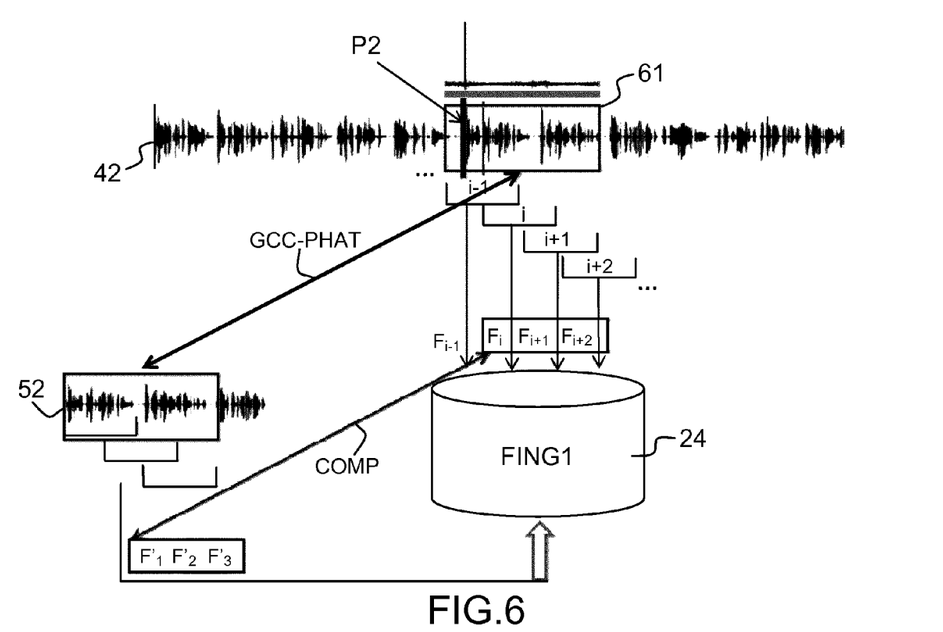
FIG. 6 shows an example of a processing combining fingerprinting and GCC-PHAT according to the invention.

At a preliminary step 40, illustrated in FIG. 4, the first processor 30 of the synchronization device 22 recovers, from the original content server 10, an original audio sequence 42 of the first multimedia stream, and generates from this original sequence 42 a set of original audio fingerprints. As represented in FIG. 6, each generated original fingerprint $F_{i-1}$, $F_i$, $F_{i+1}$, $F_{i+2}$ corresponds to an audio frame i−1, i, i+1, i+2, respectively, of the original sequence 42.

For this generation, the first processor 30 uses any suitable conventional fingerprinting algorithm, like for example the algorithm described in J. Haitsma et Al. "A highly robust audio fingerprinting system," in Proc. Int. Sym. on Music Information Retrieval (ISMIR), 2002, or the algorithm described in A. L-C. Wang, "An industrial-strength audio search algorithm," in Proc. Int. Sym. on Music Information Retrieval (ISMIR), 2003, pp. 1-4.

Preferably, the generated original audio fingerprints are stored, at a step 44, in the memory 24.

At a step 50, represented in FIG. 3, the second terminal 6 records, during a first duration, a first audio sequence 52 of the first multimedia stream rendered in the first terminal 4 using the microphone 20. The second terminal 6 starts such recording when a synchronization service is activated explicitly by the user or automatically by an application provided in said second terminal 6. Then, the second terminal 6 sends the first audio sequence 52 to the synchronization device 22 via the Internet 16.

If the bandwidth on the Internet link between the user's home 8 and the synchronization device 22 is sufficient, the first audio sequence 52 is preferably sent in a raw format. However, in order to optimize the time of delivery, it can advantageously be compressed to some extent if the quality remains acceptable to guarantee the reliability of a subsequent fingerprinting processing.

A file containing the first audio sequence 52 is, for instance, uploaded to the synchronization device 22 by using the HTTP POST protocol, for example.

The first duration is chosen to be shorter than 5 seconds, preferably comprised between 0.5 and 3 seconds. It is for example equal to 1 second.

Thus, the first audio sequence 52 corresponds to a piece of the original audio sequence 42 corrupted mainly by the acoustical environment 54 (FIG. 4) around the first terminal 4.

At step 56, the second processor 32 generates from the first sequence 52 a block of first audio fingerprints using the same fingerprinting algorithm implemented by the first processor 30 for generating the original audio fingerprints. Each generated first fingerprint $F'_1$, $F'_2$, $F'_3$ (FIG. 6) corresponds to an audio frame of the first sequence 52.

In a preferred embodiment, the second terminal 6 continues, during this processing, recording from the first terminal 4 using the microphone 20 to account for possible additional data requests from the synchronization device 22.

At step 58, the comparator 34 compares the block of first audio fingerprints and each same size block of the set of original audio fingerprints. During this comparison, a matching confidence between both audio fingerprints blocks is evaluated and compared to a first predefined threshold.

For this, the comparator 34 carries a similarity comparison by computing a distance between each pair of fingerprints from each block and by accumulating the comparison results for all pairs in the two blocks. As an example, when comparing a block of first fingerprints ($F'_1$, $F'_2$, $F'_3$) with a same size block of the original fingerprints ($F_1$, $F_2$, $F_3$), the sum distance $d(F'_1, F_1)+d(F'_2, F_2)+d(F'_3, F_3)$ is computed, where $d(F'_i, F_i)$, $1 \leq i \leq 3$, denotes the Euclidean norm or the Hamming distance between two fingerprints.

If the only minimum computed sum distance, which measures the maximal similarity between the first fingerprints and a block of the original fingerprints, is smaller than the first threshold, the fingerprint matching is declared to be confident and a unique coarse synchronization position P1 is found. This case is represented by the lower drawing of FIG. 7.

In some cases, essentially due to a very short first duration of recording or to a similar content repeated in the original stream, multiple local minimum points of the computed distance which are smaller than the first threshold or higher than the first threshold but smaller than a second pre-defined threshold may be found. In these cases, multiple coarse synchronization positions A, B, C are found with low confidence (middle drawing of FIG. 7).

In order to verify if any of the initially detected coarse synchronization positions A, B, C is the correct synchronization position, the correlator 36 computes, at step 60, GCC-PHAT cross-correlations of the first audio sequence and pieces 61 (FIGS. 6 and 7) of the original audio sequence located around the coarse synchronization positions found by fingerprinting at step 58. The computation of these cross-correlations is carried in the frequency domain.

Figure 5:
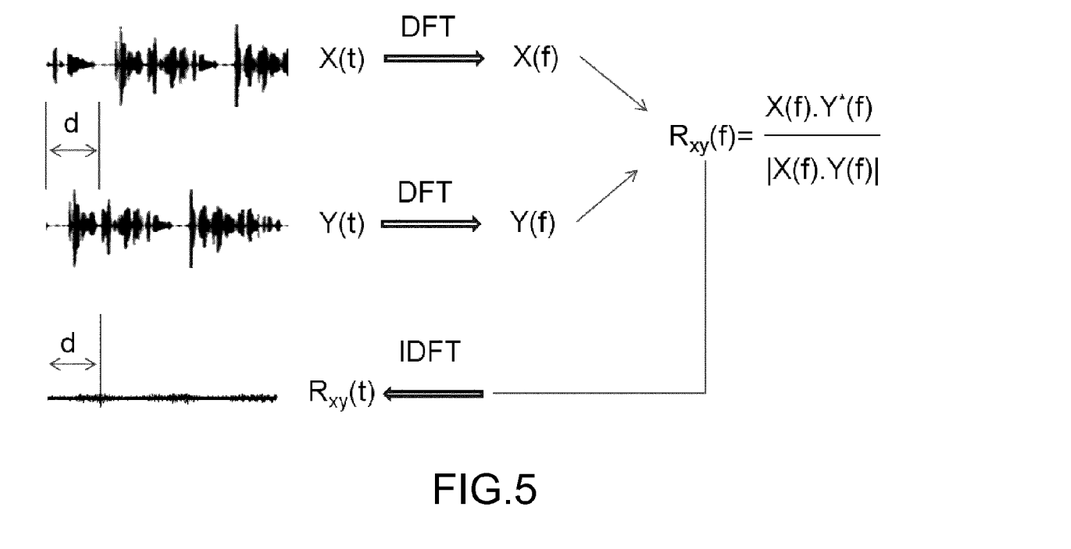
FIG. 5 details the steps of a GCC-PHAT computation of the method of FIG. 3.

FIG. 5 illustrates an example of a GCC-PHAT computation. Given a time domain signal X(t) corresponding to the piece of original audio sequence, and its delayed, by a distance d, and distorted version Y(t) corresponding to the first audio sequence, their frequency representations X(f) and Y(f), respectively, are computed using a Discrete Fourier transform (DFT). The cross-correlation of X(f) and Y(f) noted $R_{xy}(f)$ is computed according to the following formula:

$$R_{xy}(f) = \frac{X(f) \cdot Y^*(f)}{|X(f) \cdot Y(f)|}.$$

In this formula, the cross-correlation is normalized by the amplitude of the product of X(f) and Y(f) in order to retain only phase information.

The time lag d, preferably measured in number of samples, between the signals X(t) and Y(t) is then specified by the location of a peak P of $R_{xy}(t)$, which is the Inverse Discrete Fourier Transform (IDFT) of $R_{xy}(f)$.

At step 62, the comparator 34 compares the values of the obtained peaks P with a third threshold. This third threshold value can be pre-defined or adaptively computed from $R_{xy}(t)$ (i.e. taking into account the variance of $R_{xy}(t)$).

If only one peak value is higher than the third threshold, the matching confidence between the first and the corresponding piece of original audio sequences is considered as high and a unique accurate synchronization position P2 is found. The accuracy of this position is that of a sample.

Figure 7:
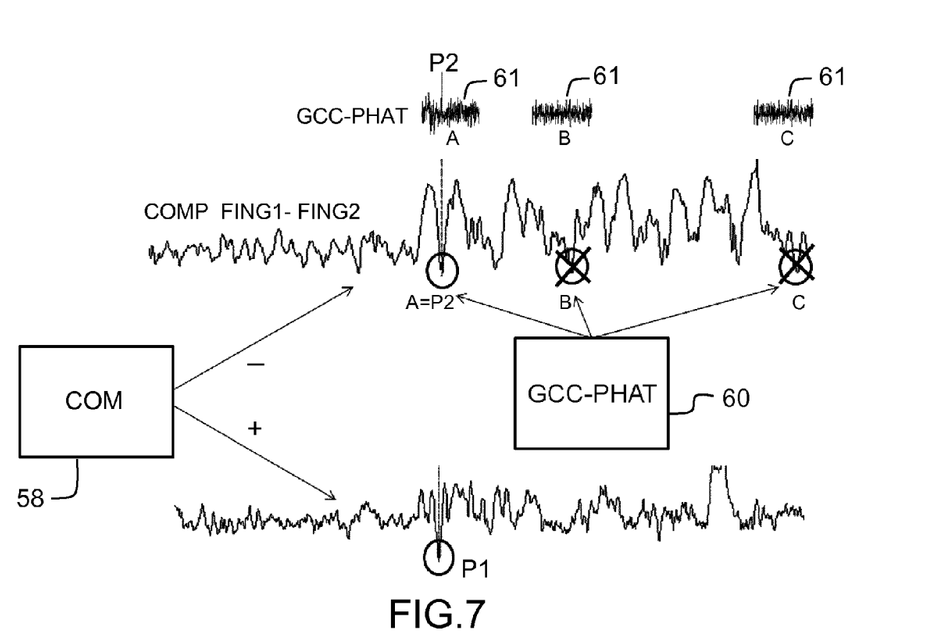
FIG. 7 shows an example of an accurate synchronization position obtained by the method of the invention.

Referring to FIG. 7, the accurate synchronization position P2 found using the GCC-PHAT cross-correlation (upper drawing) corresponds to the coarse synchronization position A while coarse synchronization positions B, C (middle drawing) are rejected.

As the fingerprints are computed on an audio frame basis, the coarse synchronization positions have a frame accuracy, which may not be sufficient for a perfect synchronization of the rendering of the multimedia streams on both terminals 4, 6.

Thus, the present invention remarkably improves the synchronization accuracy by implementing a further step of generalized cross-correlation between the original and the first audio sequences. The correlation step using GCC-PHAT can be implemented even if a unique coarse synchronization position P1 with high confidence is found in the fingerprinting step in order to obtain a sample-accurate synchronization.

The comparator 34 provides this position to the synchronizer 38 which then synchronizes the transmission of the second multimedia stream to the second terminal 6.

This synchronization may consist in indicating to the complementary content server 18 the time at which it can begin the transmission of the second multimedia stream to the second terminal 6.

The synchronization may also consist in transmitting to the second terminal 6 an information relative to the time at which said second terminal 6 can begin rendering the second multimedia stream it has already received.

If all the peak values in the fingerprint comparison are higher than the second threshold (i.e. fingerprinting cannot provide any coarse synchronization positions), or all the peak values in the cross-correlation comparison are lower than the third threshold (i.e. GCC-PHAT does not ensure a confident synchronization point), or more than one peak value in the cross-correlation comparison are higher than the third threshold, possibly because a similar content is repeated in the original stream data, the matching confidence between the first and the corresponding pieces of original audio sequences is considered as low. In this case, the synchronization device 22 requests, at step 64, a second audio sequence of recorded data from the second terminal 6. After the reception of the second sequence, the synchronization device 22 repeats steps 52 to 62 using the second sequence alone or a combination of the first and second sequences instead of the first sequence.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention includes all embodiments falling within the scope of the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed as a reference to the plural and vice versa.

A person skilled in the art will readily appreciate that various parameters disclosed in the description may be modified and that various embodiments disclosed and/or claimed may be combined without departing from the scope of the invention.

Thus, even if the above description focused on a second screen application using separate terminals, it can be advantageously applied to a scenario with only one terminal, for example when there is only one screen with a part of it displaying main content and a remaining part (picture in picture) displaying a second content. In this case, the first audio sequence used for the synchronization is either captured by decoding the broadcast content received by the terminal or by recording it directly by a microphone in the terminal.

Furthermore, the synchronization device may be integrated in the home gateway or in the set-top box or in the second screen terminal. In this case, the original audio sequence, and optionally its associated fingerprints must be stored or sent in advance to the set-top box or the gateway or the second screen terminal.

Besides, while the description above concerned a use of the invention for a user's home application, the invention may be advantageously used for second screen applications in a public building as, for example, an airport, a railway station, a hospital, etc.

The invention claimed is:

1. A method for synchronizing a first multimedia stream intended for being rendered on a first terminal and a second multimedia stream intended for being rendered on a second terminal, comprising:
   generating original audio fingerprints from an original audio sequence of the first multimedia stream;
   receiving a first sequence of audio data of the first multimedia stream, said first sequence of audio data having a first duration in a range of 0.5-3 seconds;
   generating first audio fingerprints from the first sequence of audio data;
   comparing the first audio fingerprints and blocks of the original audio fingerprints in order to obtain one or more first synchronization positions in the original audio sequence;
   cross-correlating, using a generalized cross-correlation with phase transform technique performed in the frequency domain, the first sequence of audio data with one or more pieces of the original audio sequence located around the first synchronization positions in order to obtain only one second synchronization position in the original audio sequence; and
   synchronizing the first and the second multimedia streams using the second synchronization position.

2. The method of claim 1, further comprising capturing by the second terminal, during the first duration, the first sequence of audio data of the first multimedia stream while said first sequence is rendered on said first terminal.

3. The method of claim 1, wherein said comparing further comprises computing a distance between pairs of fingerprints of the first sequence and of the original sequence.

4. The method of claim 1, wherein if a second synchronization position is not obtained in said cross-correlating, the method further comprises receiving a second sequence of audio data of the first multimedia stream, wherein said generating the first audio fingerprints, comparing and cross-correlating are repeated using the second sequence of audio data alone or a combination of the first and second sequences of audio data instead of the first sequence of audio data.

5. The method of claim 1, wherein the second terminal is the same as the first terminal.

6. The method of claim 1, wherein the second terminal is different from the first terminal.

7. The method of claim 1, wherein synchronizing further comprises transmitting to the second terminal the time at which it can begin rendering said second multimedia stream.

8. The method of claim 1, wherein said original content is received from a server, and wherein said synchronizing further comprises transmitting to said server the time at which said server can begin transmission of said second multimedia stream to said second terminal.

9. A system for synchronizing a first multimedia stream intended for being rendered on a first terminal and a second multimedia stream intended for being rendered on a second terminal, comprising:
  a first processor adapted to generate original audio fingerprints from an original audio sequence of the first multimedia stream;
  a microphone adapted to capture by the second terminal, during a first duration, a first sequence of audio data of the first multimedia stream while said first sequence of audio data is rendered on said first terminal;
  a second processor adapted to generate first audio fingerprints from the first sequence of audio data, said first sequence of audio data having a first duration in a range of 0.5-3 seconds;
  a comparator adapted to compare the first audio fingerprints and blocks of the original audio fingerprints in order to obtain one or more synchronization positions in the original audio sequence;
  a cross-correlator adapted to cross-correlate, using a generalized gross-correlation with phase transform technique performed in the frequency domain, the first sequence of audio data with one or more pieces of the original audio sequence located around the first synchronization positions in order to obtain only one second synchronization position in the original audio sequence; and
  a synchronizer adapted to synchronize the first and the second multimedia streams using the second synchronization position.

10. A device for synchronizing a first multimedia stream intended for being rendered on a first terminal and a second multimedia stream intended for being rendered on a second terminal, comprising:
  a first processor adapted to generate original audio fingerprints from an original audio sequence of the first multimedia stream;
  a second processor adapted to generate first audio fingerprints from a first sequence of audio data of the first multimedia stream having a first duration in a range of 0.5-3 seconds;
  a comparator adapted to compare the first audio fingerprints and blocks of the original audio fingerprints in order to obtain one or more first synchronization positions in the original audio sequence;
  a cross-correlator, using a generalized cross-correlation with phase transform technique performed in the frequency domain, adapted to cross-correlate the first sequence of audio data with one or more pieces of the original audio sequence located around the first synchronization positions in order to obtain only one second synchronization position in the original audio sequence; and
  a synchronizer adapted to synchronize the first and the second multimedia streams using the second synchronization position.

11. The device of claim 10, wherein said device for synchronizing is included in the second terminal.

12. The device of claim 10, wherein said device for synchronizing is included in a set-top box or in a gateway.

13. The device of claim 10, wherein the generalized cross-correlation is performed in the frequency domain.

14. The device of claim 10, wherein the second terminal captures, during the first duration, the first sequence of audio data of the first multimedia stream while said first sequence of audio data is rendered on said first terminal.

15. The device of claim 10, wherein the comparator computes a distance between pairs of fingerprints of the first sequence and of the original sequence.

16. The device of claim 10, wherein if a second synchronization position is not obtained by said cross-correlator, a second sequence of audio data of the first multimedia stream is received and the generating the first audio fingerprints, comparing and cross-correlating are repeated using the second sequence of audio data alone or a combination of the first and second sequences of audio data instead of the first sequence of audio data.

17. The device of claim 10, wherein the second terminal is the same as the first terminal.

18. The device of claim 10, wherein the second terminal is different from the first terminal.

19. The device of claim 10, wherein the second multimedia stream is rendered on the second terminal using the second synchronization position.

20. A non-transitory computer-readable program comprising computer-executable instructions stored therein which, when executed, instruct at least one processor to:
  generate original audio fingerprints from an original audio sequence of the first multimedia stream;
  receive a first sequence of audio data of the first multimedia stream, said first sequence of audio data having a first duration in a range of 0.5-3 seconds;
  generate first audio fingerprints from the first sequence of audio data;
  compare the first audio fingerprints and blocks of the original audio fingerprints in order to obtain one or more first synchronization positions in the original audio sequence;
  cross-correlate, using a generalized cross-correlation with phase transform technique performed in the frequency domain, the first sequence of audio data with one or more pieces of the original audio sequence located around the first synchronization positions in order to obtain only one second synchronization position in the original audio sequence; and
  synchronize the first and the second multimedia streams using the second synchronization position.

* * * * *